United States Patent
Satoh et al.

(10) Patent No.: US 8,294,932 B2
(45) Date of Patent: Oct. 23, 2012

(54) IMAGE FORMING APPARATUS, IMAGE FORMING SYSTEM, AND IMAGE FORMING METHOD

(75) Inventors: Yoshiaki Satoh, Kanagawa (JP); Yoshinori Furuichi, Kanagawa (JP); Akihiro Kakoi, Kanagawa (JP); Takanori Fujii, Kanagawa (JP); Eijiro Inoue, Kanagawa (JP); Tetsuo Asakawa, Tokyo (JP); Hiroya Uruta, Tokyo (JP); Kazuya Ezura, Kanagawa (JP); Yoshihiro Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 751 days.

(21) Appl. No.: 12/379,920

(22) Filed: Mar. 4, 2009

(65) Prior Publication Data

US 2009/0225356 A1     Sep. 10, 2009

(30) Foreign Application Priority Data

Mar. 7, 2008  (JP) .................................. 2008-057681

(51) Int. Cl.
G06F 3/12 (2006.01)
(52) U.S. Cl. ...................................................... 358/1.15
(58) Field of Classification Search ........................ None
See application file for complete search history.

(56) References Cited

U.S. PATENT DOCUMENTS

| | | | |
|---|---|---|---|
| 6,883,016 B1 | 4/2005 | Fujii et al. | |
| 7,343,114 B2 | 3/2008 | Uruta | |
| 2004/0213615 A1* | 10/2004 | Nakao | 400/76 |
| 2006/0282684 A1 | 12/2006 | Kakoi et al. | |
| 2007/0127050 A1 | 6/2007 | Iwata et al. | |
| 2007/0150682 A1 | 6/2007 | Ogasawara et al. | |
| 2007/0203917 A1* | 8/2007 | Du et al. | 707/10 |
| 2007/0214494 A1 | 9/2007 | Uruta et al. | |
| 2008/0141167 A1 | 6/2008 | Kubo et al. | |
| 2008/0180743 A1 | 7/2008 | Uruta et al. | |
| 2008/0243959 A1* | 10/2008 | Bacastow et al. | 707/204 |

FOREIGN PATENT DOCUMENTS

| | | |
|---|---|---|
| JP | 2004-345088 | 12/2004 |
| JP | 2006-268542 | 10/2006 |

* cited by examiner

*Primary Examiner* — Marivelisse Santiago Cordero
*Assistant Examiner* — John Wallace
(74) *Attorney, Agent, or Firm* — Harnesss, Dickey & Pierce, P.L.C.

(57) ABSTRACT

In an image forming apparatus that receives print data from an external device and prints out the print data in response to a print command, a searching unit that searches, when new print data is received from the external device, a storage unit storing therein the print data that includes user information for previous print data that includes user information same as that of the new print data; and a notifying unit that sends, when the searching unit finds the previous print data, a notice to the external device saying that the previous print data is still present in the storage unit.

11 Claims, 15 Drawing Sheets

FIG. 5A

| USER INFORMATION | CONTACT-ADDRESS INFORMATION | FILE NAME | STORAGE SETTINGS | PRINT EXECUTION SETTINGS | SETTING INFORMATION (NUMBER OF COPIES, SHEET SIZE, ETC.) | IMAGE DATA |
|---|---|---|---|---|---|---|

FIG. 5B

| USER NAME | NUMBER OF PIECES OF PREVIOUS PRINT DATA | TOTAL AMOUNT OF PREVIOUS PRINT DATA |
|---|---|---|
| AAA | 0 | 0 KB |
| BBB | 3 | 1210 KB |
| CCC | 1 | 40 KB |

FIG. 7
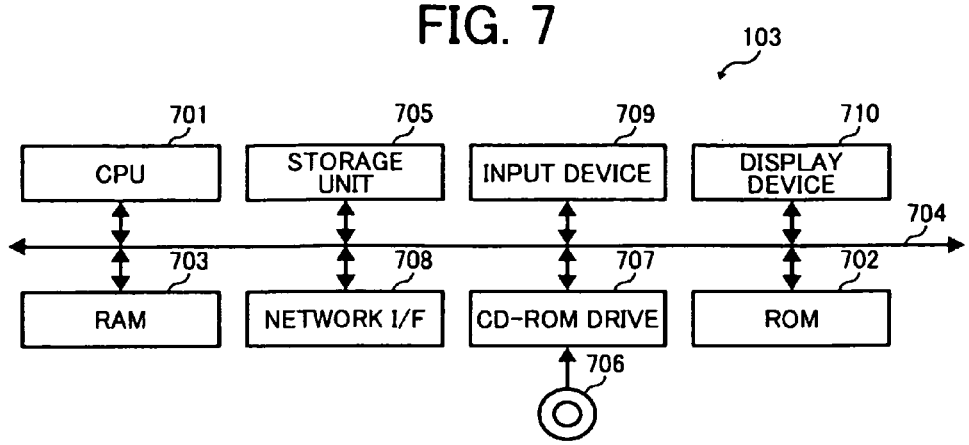
FIG. 8
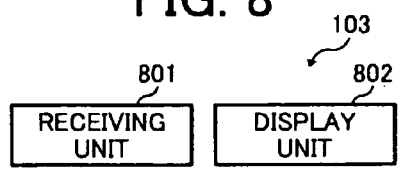
FIG. 9
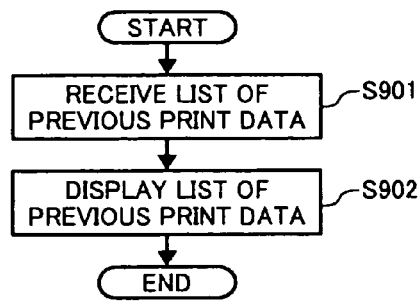
FIG. 10
| PREVIOUS PRINT DATA IS PRESENT ||
| FILE NAME | DATA AMOUNT |
| aaa.doc | 100 KB |
| bbb.pdf | 1210 KB |
| ccc.pdf | 40 KB |

FIG. 16
NOTIFICATION THRESHOLD SETTING
1 — 1601
2 — 1602
3 — 1603
4 — 1604
FIG. 17
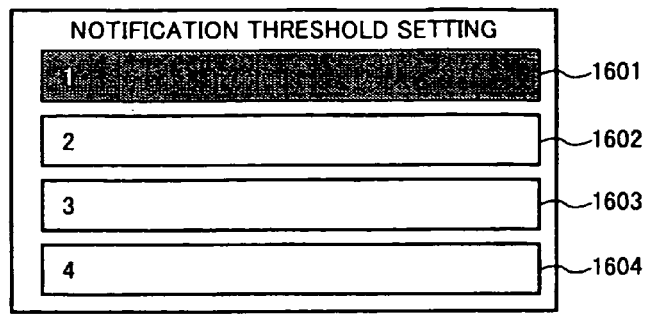
| USER NAME | NOTIFICATION THRESHOLD (NUMBER) | NOTIFICATION THRESHOLD (TOTAL AMOUNT) |
|---|---|---|
| AAA | 4 | 1000 KB |
| BBB | 8 | 10000 KB |
| CCC | 5 | 5000 KB |
FIG. 18
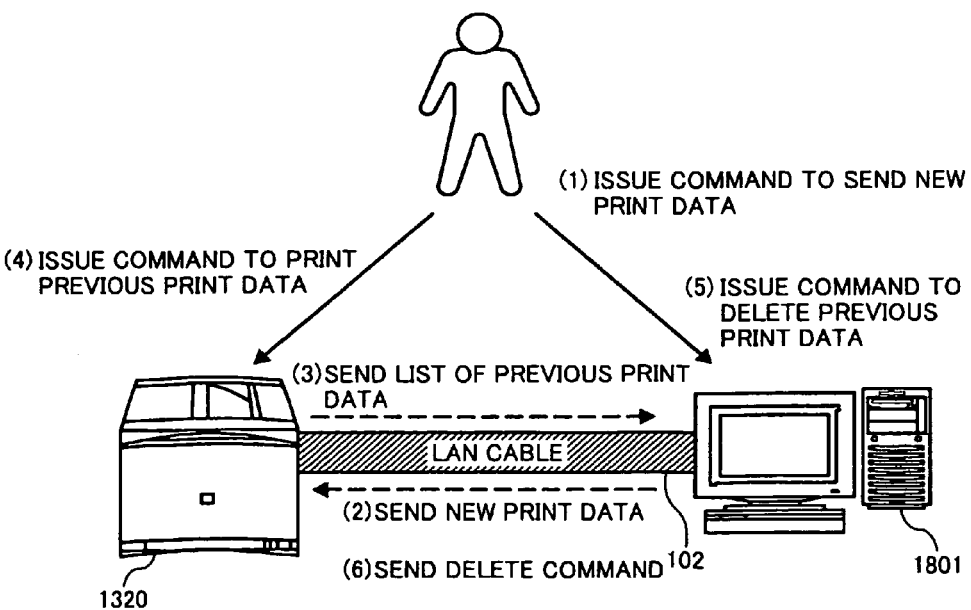

IMAGE FORMING APPARATUS, IMAGE FORMING SYSTEM, AND IMAGE FORMING METHOD

CROSS-REFERENCE TO RELATED APPLICATIONS

The present application claims priority to and incorporates by reference the entire contents of Japanese priority document 2008-057681 filed in Japan on Mar. 7, 2008.

BACKGROUND OF THE INVENTION

1. Field of the Invention

The present invention relates to an image forming apparatus, an image forming system, and an image forming method.

2. Description of the Related Art

In the field of image forming apparatuses, locked print and hold print have been known widely as effective functions to prevent leakage of confidential information from a document that a printer has output in response to a print command received from a personal computer (PC) as a host. If the locked print is ON, after receiving the print command from the PC, the printer receives a password via a control panel from a user and performs user authentication with the password. The printer starts printing only if the user is authentic. If the hold print is ON, after issuing the print command via the PC, the user has to issue a command to start printing via the control panel.

If the locked print or the hold print is ON, the printer temporarily stores data to be printed (hereinafter, "print data") in a storage unit, such as a hard disk drive (HDD), before outputting (printing) the print data. If the print data is present in the storage unit without being output, available capacity of the storage unit may become insufficient due to the print data such that the printer cannot execute a new print command by using the locked print function or the hold print function. Therefore, to execute the new print command, it is necessary to output or delete the print data from the storage unit.

To solve such problems, Japanese Patent Application Laid-open No. 2006-268542 discloses a printing system that properly manages protected print jobs stored in a server device. The printing system monitors the print jobs stored in the printer. If the printing system finds a print job that is stored in the printer for a predetermined period without printed out or if the amount of the print job stored in the printer exceeds a predetermined value, the printer sends a notice to a client device from which the print command is received or deletes the stored print job.

However, even if the printing system sends the notice to the client device, the user may not recognize the notice if the user is away from the client device. Moreover, even if the printing system sends the notice to the client device while the user is using the client device, the user may ignore the notice.

SUMMARY OF THE INVENTION

It is an object of the present invention to at least partially solve the problems in the conventional technology.

According to an aspect of the present invention, there is provided an image forming apparatus that receives print data from an external device and prints out the print data in response to a print command, the image forming apparatus including a storage unit that stores therein the print data that includes user information; a searching unit that searches, when new print data is received from the external device, the storage unit for previous print data that includes user information same as that of the new print data; and a notifying unit that sends, when the searching unit finds the previous print data, a notice to the external device saying that the previous print data is still present in the storage unit.

According to another aspect of the present invention, there is provided an image forming system including an external device; and an image forming apparatus that receives print data including user information from the external device and prints out the print data in response to a print command, wherein the image forming apparatus including a storage unit that stores therein the print data; a searching unit that searches, when new print data is received from the external device, the storage unit for previous print data that includes user information same as that of the new print data; and a notifying unit that sends, when the searching unit finds the previous print data, a notice to the external device saying that the previous print data is still present in the storage unit, and the external device includes a first receiving unit that receives the notice from the image forming apparatus; and a display unit that displays received notice.

According to still another aspect of the present invention, there is provided an image forming method realized in an image forming system that includes an external device and an image forming apparatus that receives print data from the external device and prints out the print data in response to a print command from the external device, the image forming method including the image forming apparatus performing storing the print data that includes user information received from the external device in a storage unit, searching, when new print data is received from the external device, the storage unit for previous print data that includes user information same as that of the new print data, and sending, when the previous print data is found at the searching, a notice to the external device saying that the previous print data is still present in the storage unit; and the external device performing receiving the notice from the image forming apparatus, and displaying received notice on a display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A is a schematic diagram of the structure of print data according to the first embodiment;

FIG. 5B is a schematic diagram of a table for managing previous-print-data information according to the first embodiment;

FIG. 7 is a block diagram of the hardware configuration of a PC shown in FIG. 1;

FIG. 8 is a block diagram of the software configuration of the PC shown in FIG. 7;

FIG. 9 is a flowchart of a displaying process performed by the PC according to the first embodiment;

FIG. 10 is a schematic diagram of a list of previous print data appearing on the display device according to the first embodiment;

FIG. 16 is a schematic diagram of a screen appearing on the operation display unit for setting a notification threshold according to the third embodiment;

FIG. 17 is a table of the notification threshold that is managed on the user basis according to the third embodiment;

FIG. 18 is a schematic diagram for explaining a printing process in a printing system according to a fourth embodiment of the present invention;

DETAILED DESCRIPTION OF THE PREFERRED EMBODIMENTS

Exemplary embodiments of the present invention are described in detail below with reference to the accompanying drawings. A multifunctional product (MFP) including a printer function, a scanner function, a facsimile function, and a copier function is used as a typical image forming apparatus in the following embodiments. However, any type of the image forming apparatus such as a facsimile, a printer, and a copier can be used instead.

Figure 1:
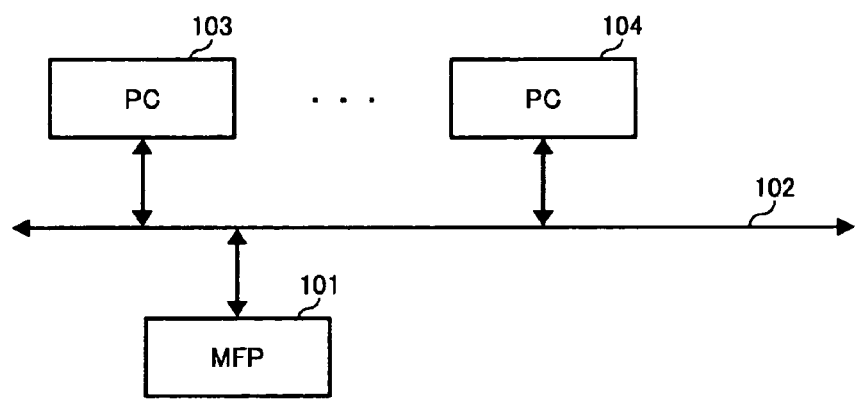
FIG. 1 is a block diagram of a printing system according to a first embodiment of the present invention.

FIG. 1 is a block diagram of a printing system according to a first embodiment of the present invention. The printing system includes an MFP 101, a plurality of PCs 103 and 104, and a network 102 that connects those devices to each other. Although two PCs are shown in FIG. 1, the number of PCs is not limited to two. The PCs 103 and 104 create print data from both a created or edited document and device information, and send the created print data to the MFP 101 via the network 102. The MFP 101 stores therein or prints out the received print data.

Figure 2:
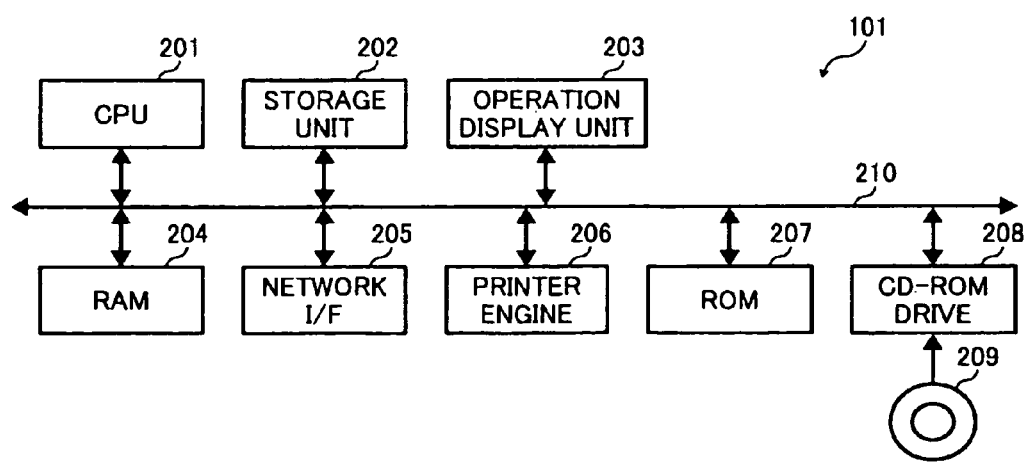
FIG. 2 is a block diagram of the hardware configuration of an MFP shown in FIG. 2.

FIG. 2 is a block diagram of the hardware configuration of the MFP 101 according to the first embodiment. The MFP 101 includes a central processing unit (CPU) 201 that controls units of the MFP 101. The CPU 201 is connected to a read only memory (ROM) 207 that stores therein a basic input/output system (BIOS) etc., and a random access memory (RAM) 204 that stores therein data in a rewritable state via a bus 210.

The MFP 101 includes a storage unit 202, a compact disk-read only memory (CD-ROM) drive 208, a network interface (I/F) 205, an operation display unit 203, and a printer engine 206, connected to the bus 210 via an input/output (I/O) unit (not shown). The storage unit 202 is, for example, an HDD and stores therein various software programs. The CD-ROM drive 208 reads a software program from a CD-ROM 209. The network I/F 205 controls communications between the MFP 101 and the network 102. The operation display unit 203 includes a display unit and a speaker. On the display unit, information and various switches for receiving various commands appear as indicators. The display unit can be, for example, a cathode ray tube (CRT) and a liquid crystal display (LCD). The printer engine 206 is used to print data in all modes including a printer mode, a facsimile mode, and a copy mode. The printer engine 206 can be any type of printer such as a laser printer, a light-emitting diode (LED) printer, or an inkjet printer.

Figure 3:
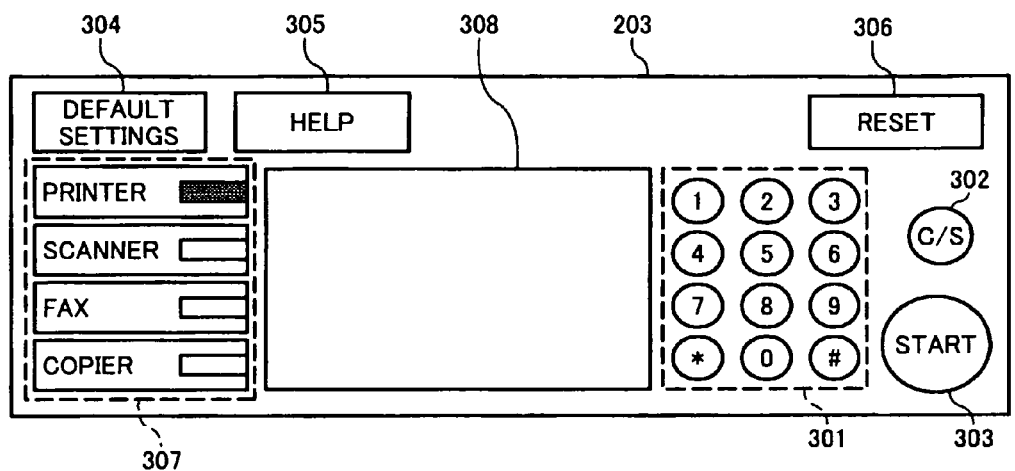
FIG. 3 is a schematic diagram of an operation display unit shown in FIG. 2.

FIG. 3 is a schematic diagram of the operation display unit 203 according to the first embodiment. A numeric key keypad 301 is used to input, for example, the number of copies. A clear/stop (C/S) key 302 is used to interrupt a copy operation. A start key 303 is used to start a copy operation. A default setting key 304 is used to display a screen for specifying default settings. A help key 305 is used to display a help screen for explaining operations of any function in activity. A reset key 306 is used to forcibly end any function in activity. An application switch key 307 is used to switch the functions (copy mode, scanner mode, facsimile mode, and printer mode). Characters strings and bitmaps are displayed on a screen 308. Assume now that the screen 308 is a touch panel. The user operates the MFP 101 by touching the screen 308.

The CPU 201 uses the RAM 204 as a working area because the RAM 204 stores therein data in the rewritable state. That is, the RAM 204 works as a buffer.

The CD-ROM 209 shown in FIG. 2 is a recording medium that stores therein an operating system (OS) and various software programs. The CPU 201 reads the software programs from the CD-ROM 209 using the CD-ROM drive 208, and installs the software programs to the storage unit 202.

It is allowable to use an optical disk such as a digital versatile disk (DVD), a magnet optical disk, a magnet disk such as a flexible disk (FD), and a semiconductor memory as the recording medium instead of the CD-ROM 209. Moreover, it is allowable to download the software programs from a server on the network 102 such as the Internet via the network I/F 205, and install the downloaded programs to the storage unit 202. In this case, a storage device of the server that uploads the software programs is assumed to be the recording medium. The software programs can be ones executable on the predetermined OS, or a part of a series of program files as a predetermined application program or a predetermined OS.

The CPU 201, which controls operations of the MFP 101, implements various processes by executing the software programs that are loaded on the storage unit 202. The storage unit 202 works as a main storage unit of the printing system.

Salient functions of the MFP 101 are described below from among the functions that are implemented by executing the software programs in the storage unit 202 by the CPU 201.

Figure 4:
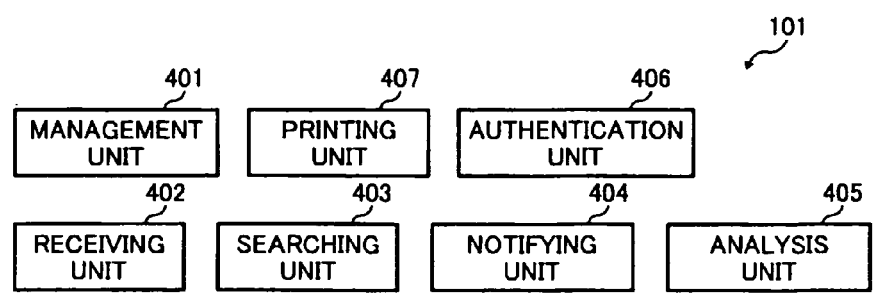
FIG. 4 is a block diagram of the software configuration of the MFP shown in FIG. 2.

FIG. 4 is a block diagram of the software configuration of the MFP 101. The MFP 101 includes a management unit 401, a receiving unit 402, a searching unit 403, a notifying unit 404, an analysis unit 405, an authentication unit 406, and a printing unit 407. Those units are implemented by executing a printing process program.

The management unit 401 manages the print data that is received from any of the PCs 103 and 104. The print data includes user information. In the first embodiment, the received print data is stored in the storage unit 202. After the print data is printed out in response to a command that is received via the operation display unit 203, the management unit 401 deletes the printed print data from the storage unit 202. FIG. 5A is a schematic diagram of the structure of the print data. The print data includes user information, contact-address information, a file name, storage settings, print execution settings, setting information, and image data.

The user information is used for identifying the user who issues the command to store or print the print data. The user information is, for example, a user name, a password, etc. The contact-address information is information for identifying the PC from which the print data is received (e.g., internet protocol (IP) address), a mail address of the user who creates the print data, or the like. The file name is used for identifying the print data stored in the PC.

The print execution settings indicate whether the MFP 101 is to print out the print data immediately after receiving the print data. The setting information includes the number of copies to be printed out, a size of sheets to be used for the printing, etc. The image data is images to be printed on the sheets.

The storage settings indicate whether the print data is to be stored in the storage unit 202. For example, the storage settings include a mode in which the print data is stored in the storage unit 202 (hereinafter, "normal spool mode"), a mode in which the print data is not printed out until the password is received from the operation display unit 203 and it is determined based on the received password that the user is authentic (hereinafter, "locked print mode"), and a mode in which the print data is not printed out until a command to start printing is received via the operation display unit 203 (hereinafter, "normal print mode").

The management unit 401 determines whether the received print data needs to be stored in the storage unit 202 based-on the storage settings included in the received print data. If one of the normal spool mode, the locked print mode, and the normal print mode is selected, the management unit 401 determines that the received print data needs to be stored in the storage unit 202.

The management unit 401 stores and updates information about print data that is stored in the storage unit 202 (hereinafter, "previous-print-data information") in accordance with storing or deletion of the print data in or from the storage unit 202. The previous-print-data information includes the number of pieces, the total amount, and the file name of the print data stored in the storage unit 202. The previous-print-data information is managed on the user basis. FIG. 5B is a schematic diagram of a table for managing the previous-print-data information according to the first embodiment. The table includes the user name, the number of pieces of the previous print data, and the total amount of the previous print data in the associated manner. The table is stored in the storage unit 202.

The receiving unit 402 receives an input of the print data from any of the PCs 103 and 104. In the first embodiment, the input of the print data is received via the network I/F 205.

The searching unit 403 searches the storage unit 202 for previous print data that includes the user information same as that in new print data. In the first embodiment, the searching unit 403 searches the storage unit 202 for the previous print data by using the user information included in the new print data received by the receiving unit 402.

If the searching unit 403 finds the previous print data in the storage unit 202, the notifying unit 404 sends a notice to a corresponding one of the PCs 103 and 104 that the previous print data is still present in the storage unit 202. In the first embodiment, the notifying unit 404 acquires from the storage unit 202 the previous-print-data information (e.g., list of the previous print data) associated with the user identified by the user information included in the new print data, and sends the acquired previous-print-data information to the PC of the user via the network I/F 205 as the notice. The PC to which the previous-print-data information is sent is identified by the contact-address information included in the new print data.

The analysis unit 405 analyzes the print data stored in the storage unit 202. In the first embodiment, the analysis unit 405 acquires the print execution settings of the print data that is stored in the storage unit 202, and determines based on the acquired print execution settings whether the print data needs to be printed out.

Only if the analysis unit 405 determines that the print data needs to be printed out, the authentication unit 406 determines whether the user who issues the command to print the print data is authentic. In the first embodiment, the authentication unit 406 determines whether the user information (password) included in the print data that is determined by the analysis unit 405 to be printed out matches a password that is received from the user via the operation display unit 203. In the first embodiment, the receiving unit 402 receives the password from the user via the operation display unit 203 for the user authentication.

The printing unit 407 prints out the new print data that is received by the receiving unit 402 and the previous print data that is stored in the storage unit 202 based on contents of the command to print the print data. More particularly, the printing unit 407 converts the print data to bitmap data, and temporarily loads the bitmap data on the RAM 204. After that, the printing unit 407 sends the bitmap data to the printer engine 206 and prints the bitmap data with the printer engine 206. In the first embodiment, if the authentication unit 406 determines that the user is authentic, the print data is printed out. However, conditions where the print data is printed out are not limited. It is allowable to execute printing in response to, for example, receiving of the command to print the previous print data from the user via the operation display unit 203.

Figure 6:
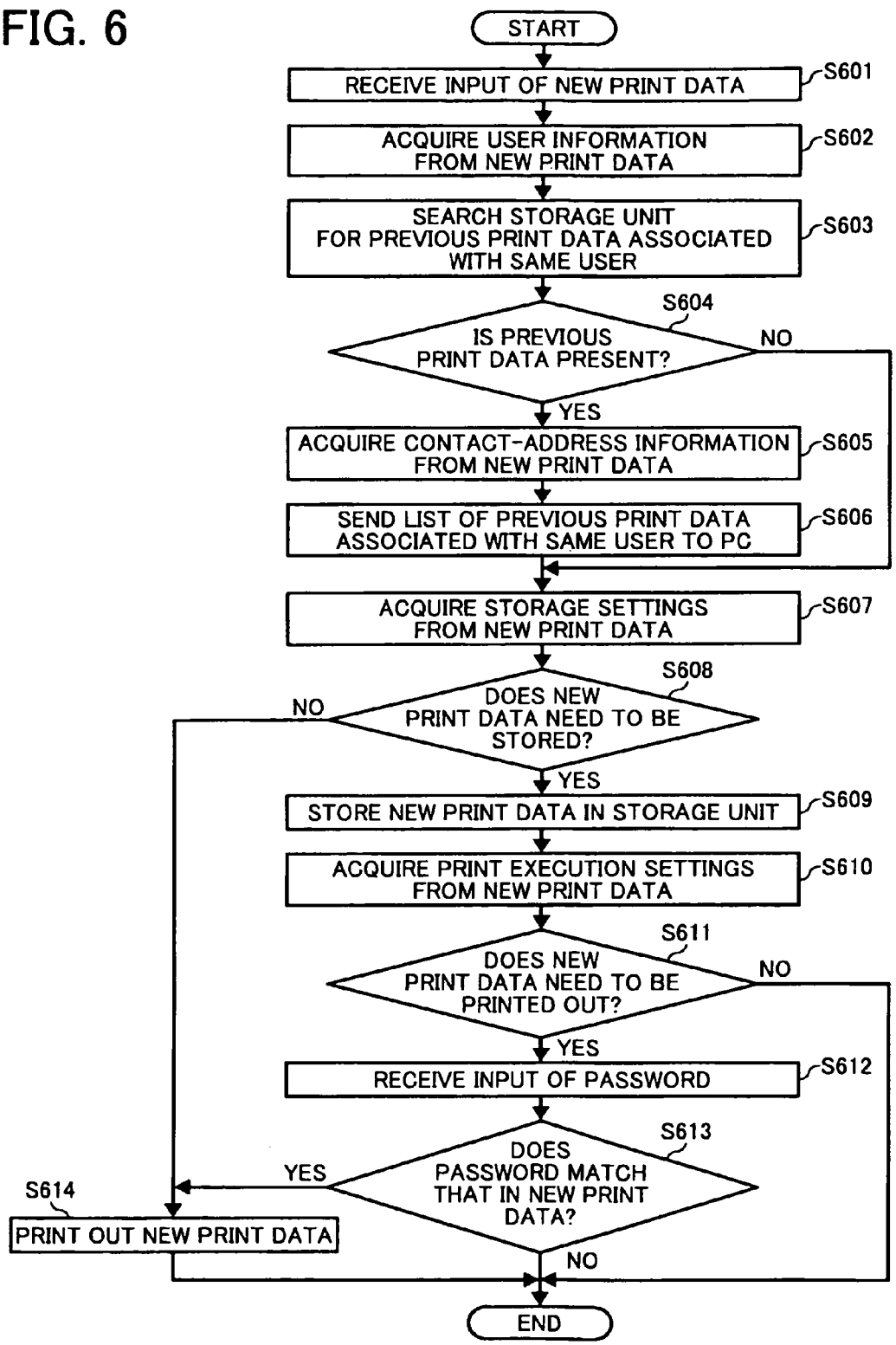
FIG. 6 is a flowchart of a printing process performed by the MFP according to the first embodiment.

FIG. 6 is a flowchart of a printing process performed by the MFP 101 according to the first embodiment. Assume now that the PC 103 sends the print data to the MFP 101.

The receiving unit 402 receives the input of the new print data from the PC 103 (Step S601). The searching unit 403 acquires the user information from the new print data (Step S602). The searching unit 403 searches the storage unit 202 for the previous print data that is associated with the same user (Step S603). More particularly, the searching unit 403 searches the storage unit 202 for the previous print data including the user information that matches the acquired user information.

If the previous print data is present in the storage unit 202 (Yes at Step S604), the notifying unit 404 acquires the contact-address information from the new print data (Step S605). The notifying unit 404 sends the list of the previous print data that is stored in the storage unit 202 to the PC that is identified by the acquired contact-address information (i.e., the PC 103) as the notice (Step S606).

If the previous print data is not present in the storage unit 202 (No at Step S604) or after the notifying unit 404 sends the list of the previous print data to the PC 103 (Step S606), the management unit 401 acquires the storage settings from the new print data (Step S607). The management unit 401 determines whether the new print data needs to be stored in the storage unit 202 based on the acquired storage settings (Step S608). If the new print data does not need to be stored (No at Step S608), the printing unit 407 prints out the new print data (Step S614).

On the other hand, if the new print data needs to be stored (Yes at Step S608), the management unit 401 stores the new print data in the storage unit 202 (Step S609).

The analysis unit 405 acquires the print execution settings from the new print data (Step S610). The analysis unit 405 determines whether the new print data needs to be printed out based on the acquired print execution settings (Step S611). If the new print data does not need to be printed out (No at Step S611), the process control ends the process with the new print data being unprinted.

If the new print data needs to be printed out (Yes at Step S611), the receiving unit 402 receives the input of the password from the user via the operation display unit 203 (Step S612). The authentication unit 406 determines whether the received password matches the user information (password) included in the new print data (Step S613). If the received password does not match the user information in the new print data (No at Step S613), the process control ends the process with the new print data being unprinted.

On the other hand, if the received password matches the user information of the new print data (Yes at Step S613), the printing unit 407 reads the new print data from the storage unit 202 and prints out the new print data (Step S614).

FIG. 7 is a block diagram of the hardware configuration of the PC 103. Because the configurations of the PCs 103 and 104 are same, only the configuration of the PC 103 is described below. The PC 103 includes a CPU 701 that controls units of the PC 103. The CPU 701 is connected to a ROM 702 that stores therein a BIOS, etc., and a RAM 703 that stores therein data in the rewritable state via a bus 704.

The PC 103 includes a storage unit 705, a CD-ROM drive 707, a network I/F 708, an input device 709, and a display device 710, connected to the bus 704 via an I/O unit (not shown). The storage unit 705 is, for example, an HDD and stores therein various software programs. The CD-ROM drive 707 reads a software program from a CD-ROM 706. The network I/F 205 controls communications between the PC 103 and the network 102. The input device 709 can be, for example, a keyboard or a mouse. The user operates the input device 709 to issue various operational commands. The display device 710 can be, for example, a CRT or a LCD. The display device 710 displays thereon information.

The CPU 701 uses the RAM 703 as a working area because the RAM 703 stores therein data in the rewritable state. That is, the RAM 703 works as a buffer.

The CD-ROM 706 shown in FIG. 7 is a recording medium that stores therein an OS and various software programs. The CPU 701 reads the software programs from the CD-ROM 706 using the CD-ROM drive 707, and installs the software programs to the storage unit 705.

It is allowable to use an optical disk such as a DVD, a magnet optical disk, a magnet disk such as an FD, and a semiconductor memory as the recording medium instead of the CD-ROM 706. Moreover, it is allowable to download the software programs from a server on the network 102 such as the Internet via the network I/F 708, and install the downloaded programs to the storage unit 705. In this case, a storage device of the server that uploads the software programs is assumed to be the recording medium. The software programs can be ones executable on the predetermined OS, or a part of a series of program files as a predetermined application program or a predetermined OS.

The CPU 701, which controls operations of the PC 103, implements various processes by executing the software programs that are loaded on the storage unit 705. The storage unit 705 works as a main storage unit of the printing system.

Salient functions of the PC 103 are described below from among the functions that are implemented by executing the software programs in the storage unit 705 by the CPU 701.

FIG. 8 is a block diagram of the software configuration of the PC 103. FIG. 9 is a flowchart of a displaying process performed by the PC 103. The PC 103 includes a receiving unit 801 and a display unit 802. Those units are implemented by executing the software program.

The receiving unit 801 receives the notice from the MFP 101 that the previous print data is still present. In the first embodiment, the receiving unit 801 receives the list of the previous print-data via the network I/F 708 (Step S901).

The display unit 802 displays the list of the previous print data (Step S902). In the first embodiment, the display unit 802 notifies the user that the previous print data is still present in the MFP 101 by displaying the received list of the previous print data on the display device 710. FIG. 10 is a schematic diagram of the list of the previous print data appearing on the display device 710 according to the first embodiment. A message saying that the previous print data is still present and a table including file name and amount of the previous print data in the associated manner appear as shown in FIG. 10. Thus, the user sees the display device 710 and notices that the previous print data is still present.

In this manner, in the first embodiment, when the MFP 101 receives the input of the new print data with the previous print data being present in the storage unit 202, the MFP 101 sends the list of the previous print data to the user as a notice. Thus, the user who has issued the command to print the new print data from the PC 103 can surely see the notice and process the previous print data.

A second embodiment of the present invention is described with reference to the accompanying drawings. Most functions and configuration of an MFP used in the second embodiment are the same as those of the MFP used in the first embodiment. Therefore, only parts different from those in the first embodiment are described below. The MFP according to the second embodiment determines whether the new print data needs to be stored based on the storage settings included in the new print data. Only if the new print data needs to be stored, the MFP sends the list of the previous print data. With this configuration, the MFP sends the list of the previous print data only when the available capacity of the storage unit is expected to be insufficient by storing the new print data. That is, the MFP sends the notice more efficiently.

Figure 11:
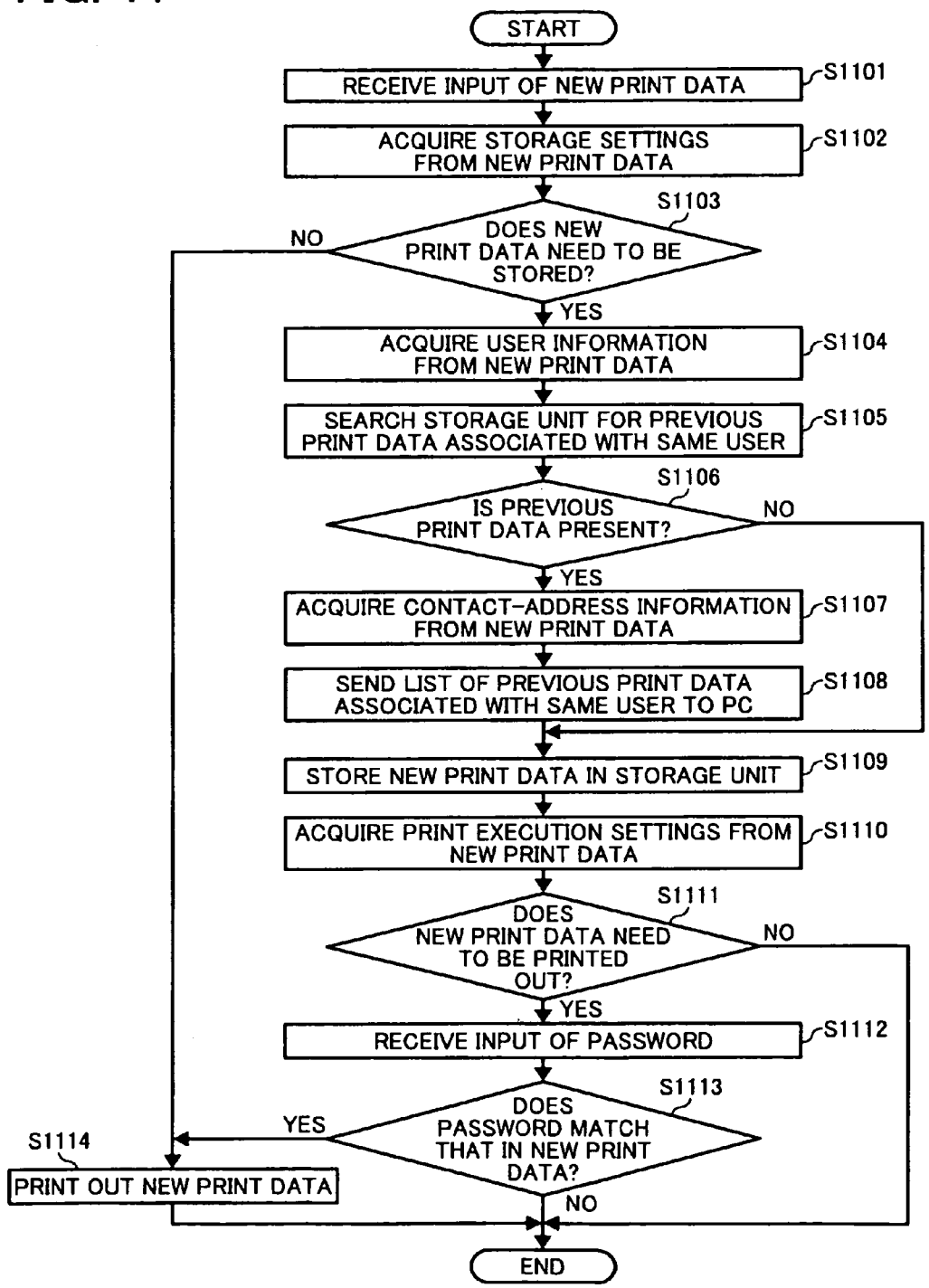
FIG. 11 is a flowchart of a printing process performed by an MFP according to a second embodiment of the present invention.

FIG. 11 is a flowchart of a printing process performed by the MFP 101 according to the second embodiment. Only parts different from the printing process according to the first embodiment are described, and the same description about steps corresponding to those in the flowchart of FIG. 6 is not repeated. That is, the description about Step S1101 and Step S1104 to Step S1114 is not repeated.

In the second embodiment, the management unit 401 determines, based on settings about modes of printing under which the notice is to be sent, whether the process indicated by Step S1102 and Step S1103 needs to be performed in which it is determined whether the new print data needs to be stored in the storage unit 202, before acquiring the user information from the new print data.

Figure 12:
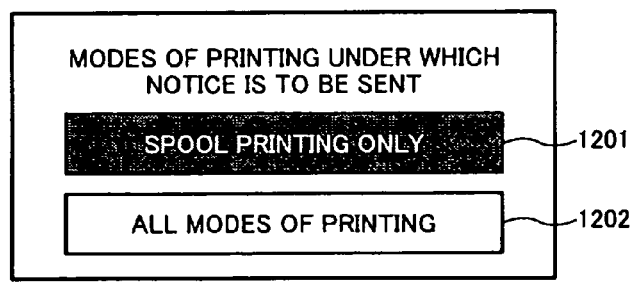
FIG. 12 is a schematic diagram of a screen appearing on the operation display unit for setting about modes of printing under which a notice is to be sent according to the second embodiment.

FIG. 12 is a schematic diagram of a screen appearing on the operation display unit 203 for setting about modes of printing under which the notice is to be sent according to the second embodiment. A user sets a mode of printing under which the notice is to be sent in advance. In the second embodiment, the user selects either a spool-printing-only button 1201 or an all-modes-of-printing button 1202. If the spool-printing-only button 1201 is selected, the management unit 401 determines whether the new print data needs to be stored at Step S1102 and Step S1103 before sending the notice of the list of the previous print data. On the other hand, if the all-modes-of-printing button 1202 is selected, the management unit 401 determines whether the new print data needs to be stored after sending the notice of the list of the previous print data in the same manner as in the first embodiment.

If the new print data needs to be stored (Yes at Step S1103), the notifying unit 404 sends the list of the previous print data to the PC 103 as the notice (Step S1107 and Step S1108). In other words, only if the receiving unit 402 receives the input of the new print data that is not printed out until receiving of the command to start printing from the user via the operation display unit 203, the notifying unit 404 sends the list of the previous print data to the PC 103. More particularly, only when the print data including any of the locked print mode, the normal print mode, and the normal spool mode as the storage settings is received, the notifying unit 404 sends the list of the previous print data to the PC 103.

In this manner, in the second embodiment, only when the MFP receives the input of the new print data to be stored, the list of the previous print data can be sent to the user. Thus, the process of sending the list of the previous print data to the user can be improved from viewpoint of the efficiency. Moreover, the user who has issued the command to print the new print data via the PC 103 can surely see the notice and process the previous print data.

A third embodiment of the present invention is described with reference to the accompanying drawings. Most functions and configuration of an MFP used in the third embodiment are the same as those of the MFP used in the second embodiment. Therefore, only parts different from those in the second embodiment are described below. In the third embodiment, if it is determined that the amount of the previous print data is equal to or larger than a notification threshold, the MFP sends the list of the previous print data as the notice to the user. Thus, the user who has issued the command to print the new print data via the PC can surely see the notice and process the previous print data.

Figure 13A:
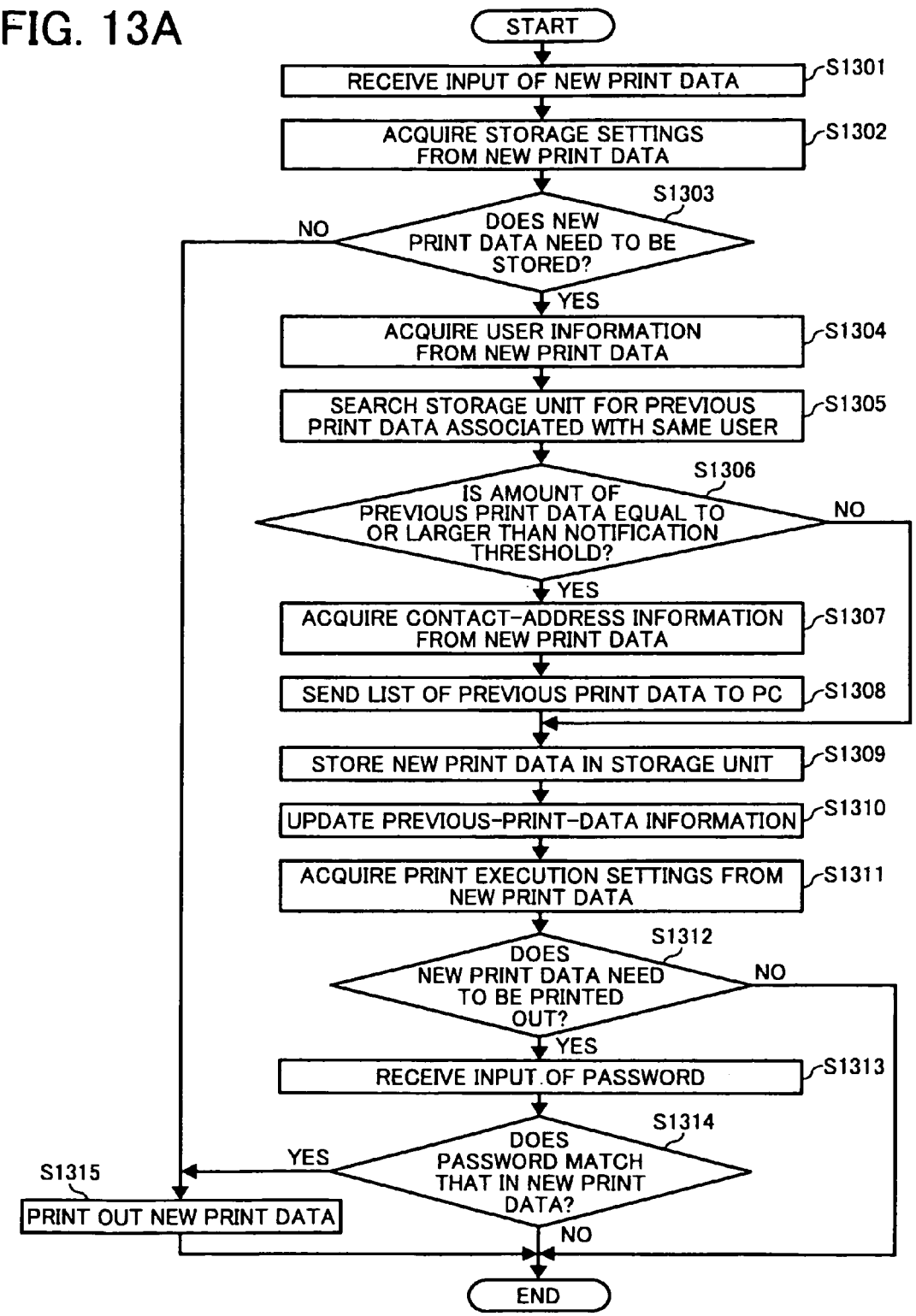
FIG. 13A is a flowchart of a printing process performed by an MFP according to the third embodiment.
Figure 13B:
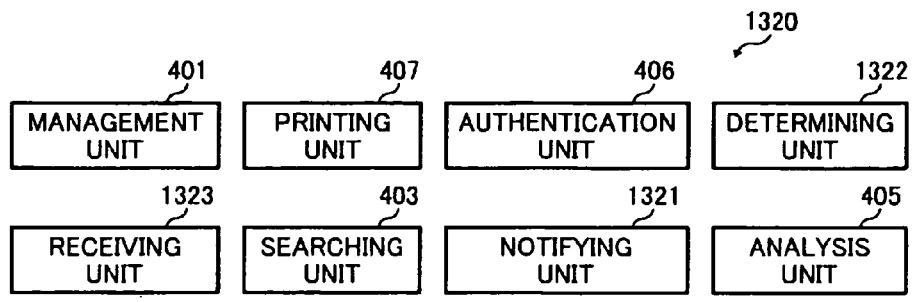
FIG. 13B is a block diagram of the MFP according to the third embodiment.

FIG. 13A is a flowchart of a printing process performed by an MFP 1320 according to the third embodiment. Only parts different from the printing process according to the second embodiment are described, and the same description about steps corresponding to those in the flowchart of FIG. 11 is not repeated. That is, the description about Step S1301 to Step S1305, Step S1307 to Step S1309, and Step S1311 to Step S1315 is not repeated. FIG. 13B is a block diagram of the MFP 1320 according to the third embodiment. As compared with the MFP 101 according to the second embodiment, the MFP 1320 includes a receiving unit 1323 and a notifying unit 1321 instead of the receiving unit 402 and the notifying unit 404, and additionally includes a determining unit 1322.

The determining unit 1322 determines whether the amount of the previous print data that is found by the searching unit 403 is equal to or larger than the notification threshold (Step S1306). In the third embodiment, the determining unit 1322 identifies the user by the user information included in the previous print data, acquires data amount associated with the identified user, and compares the acquired data amount with the notification threshold. The data amount indicates at least one of the number of pieces of the previous print data that is found by the searching unit 403 and the total amount of the previous print data. The previous-print-data information is, for example, the table of data shown in FIG. 5B that is managed by the management unit 401.

Figure 14:
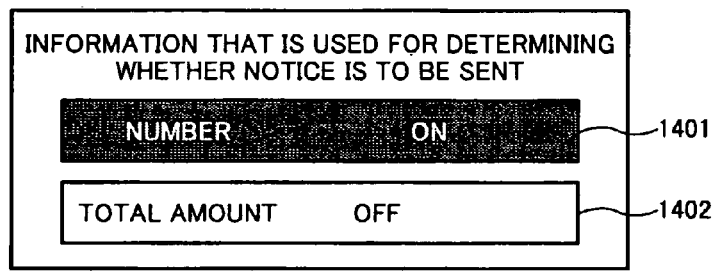
FIG. 14 is a schematic diagram of a screen appearing on the operation display unit for receiving settings about data amount according to the third embodiment.

The receiving unit 1323 receives settings about the data amount. More particularly, the receiving unit 1323 receives settings for specifying at least one of the number of the pieces and the total amount as the data amount. FIG. 14 is a schematic diagram of a screen appearing on the operation display unit 203 for receiving the settings about the data amount according to the third embodiment. The user sets via the operation display unit 203 the data amount based on which whether the notice needs to be sent is determined. In the third embodiment, the user sets the data amount by switching a number button 1401 and a total amount button 1402 to ON/OFF.

If, for example, the number button 1401 is ON, the determining unit 1322 determines whether the number of the pieces of the previous print data is equal to or larger than the notification threshold. If, for example, the total amount button 1402 is ON, the determining unit 1322 determines whether the total amount of the previous print data is equal to or larger than the notification threshold.

Figure 15:
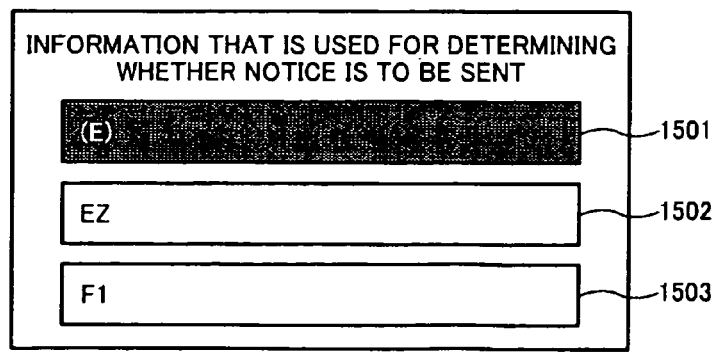
FIG. 15 is a schematic diagram of a screen appearing on the operation display unit for identifying a user according to the third embodiment.

The receiving unit 1323 receives settings about the notification threshold on the user basis. FIG. 15 is a schematic diagram of a screen appearing on the operation display unit 203 for identifying the user according to the third embodiment. When the user tries to set the notification threshold, the user selects one of a user E button 1501, a user EZ button 1502, and a user F1 button 1503 on the screen shown in FIG. 15 via the operation display unit 203. FIG. 16 is a schematic diagram of a screen appearing on the operation display unit 203 for setting the notification threshold according to the third embodiment. The user sets a value of the notification threshold for the number by selecting one of a button 1601 indicating "1", a button 1602 indicating "2", a button 1603 indicating "3", and a button 1604 indicating "4" via the operation display unit 203. When the user tries to set the total amount as the data amount, the user sets the notification threshold for the total amount in the similar manner.

After received by the receiving unit 1323, the notification threshold is stored in the storage unit 202 by the determining unit 1322. FIG. 17 is a table of the notification threshold that is managed on the user basis according to the third embodiment. The table shown in FIG. 17 includes the user name, the notification threshold for the number, and the notification threshold for the total amount in the associated manner.

If the determining unit 1322 determines that the data amount is equal to or larger than the notification threshold (Yes at Step S1306), the notifying unit 1321 identifies the user by using the user information included in the new print data, and sends the list of the previous print data as the notice to the user (Step S1307 and Step S1308). If the determining unit 1322 determines that the data amount is smaller than the notification threshold (No at Step S1306), the management unit 401 stores the new print data in the storage unit 202 (Step S1309) with the list of the previous print data unsent.

After storing the new print data in the storage unit 202, the management unit 401 updates the previous-print-data information associated with the user who is identified by the user information included in the new print data (Step S1310).

In this manner, in the third embodiment, if the data amount of the print data including the same user information as the new print data includes is equal to or larger than the notification threshold, the MFP 1320 sends the list of the previous print data to the user. Thus, the user who has issued the command to print the new print data via the PC 103 can surely see the notice and process the previous print data.

A fourth embodiment of the present invention is described with reference to the accompanying drawings. Most functions and configuration of an MFP used in the fourth embodiment are the same as those of the MFP used in the third embodiment. Therefore, only parts different from those in the third embodiment are described below. FIG. 18 is a schematic diagram for explaining a printing process in a printing system according to the fourth embodiment. Although a single PC 1801 is shown in FIG. 18, the MFP 1320 can be connected to a plurality of PCs. The user issues a command to send the new print data with the PC 1801 (see (1)). The PC 1801 sends the new print data to the MFP 1320 via the network 102 (see (2)). The network 102 can be, for example, a local area network (LAN) cable. The MFP 1320 sends the list of the previous print data to the PC 1801 as the notice in the same manner as described in the above embodiments (see (3)). The user issues, in response to the notice, a command to print the previous print data to the MFP 1320 (see (4)). Alternatively, the user causes the PC 1801 to stop storing the new print data and issues a command to delete the previous print data from the MFP 1320 (hereinafter, "delete command") (see (5)). The PC 1801 then sends the delete command to the MFP 1320 (see (6)).

Figure 19:
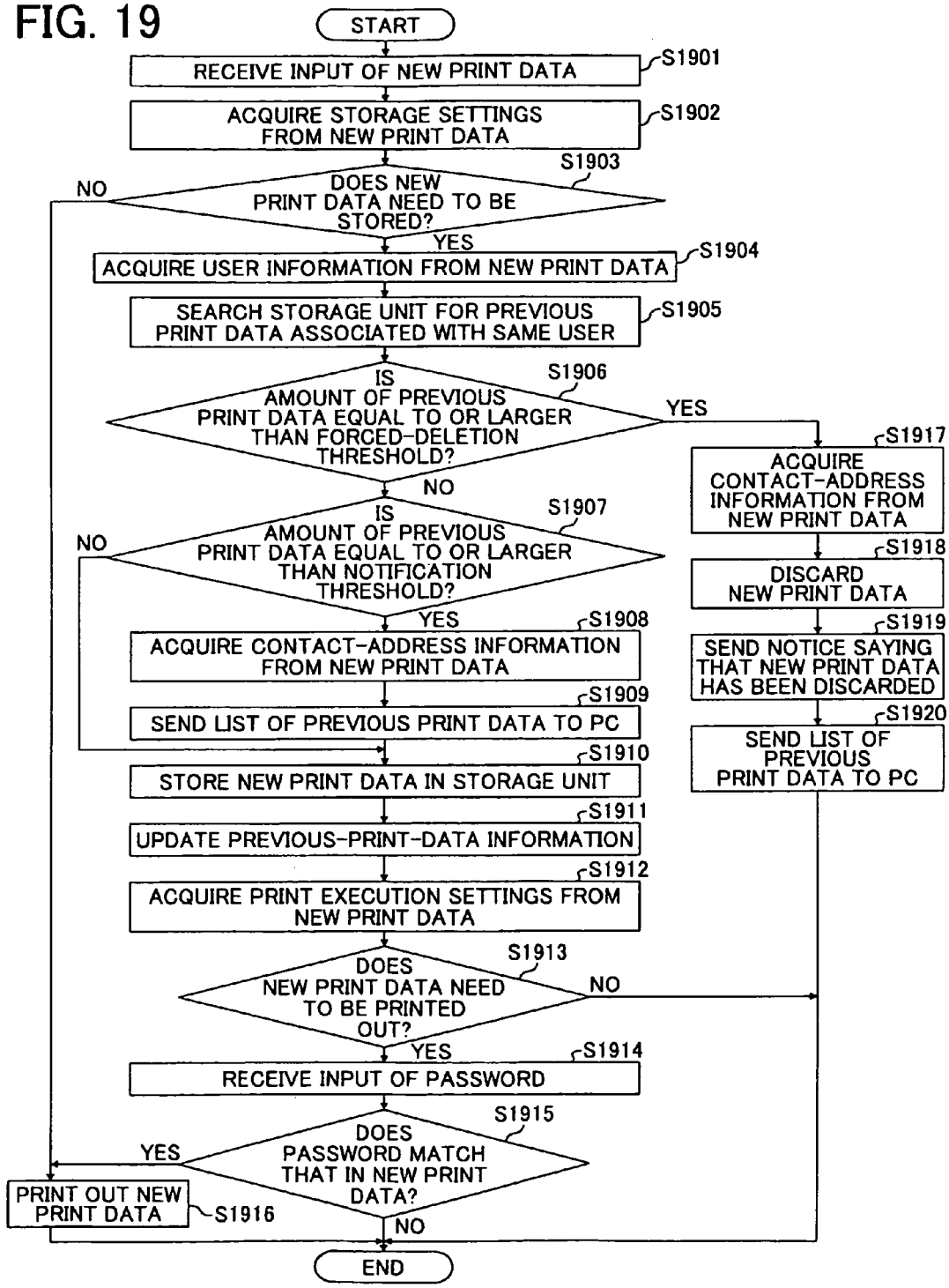
FIG. 19 is a flowchart of the printing process performed by an MFP according to the fourth embodiment.

FIG. 19 is a flowchart of the printing process performed by the MFP 1320 according to the fourth embodiment. Only parts different from the printing process according to the third embodiment are described, and the same description about steps corresponding to those in the flowchart of FIG. 13A is not repeated. That is, the description about Step S1901 to Step S1905 and Step S1907 to Step S1916 is not repeated.

The determining unit 1322 determines whether the data amount of the previous print data that is found by the searching unit is equal to or larger than a forced-deletion threshold (Step S1906). The forced-deletion threshold is set to a value larger than the notification threshold. In the fourth embodiment, the determining unit 1322 identifies the user by the user information included in the new print data, acquires data the amount associated with the identified user, and compares the acquired data amount with the forced-deletion threshold. As in the same manner in the third embodiment, the data amount indicates at least one of the number of pieces of the print data and the total amount of the print data. The previous-print-data information is, for example, the table of data shown in FIG. 5B that is managed by the management unit 401.

The receiving unit 1323 receives settings about the data amount and settings about the notification threshold on the user basis in the same manner as in the third embodiment. The same description is not repeated.

Figure 20:
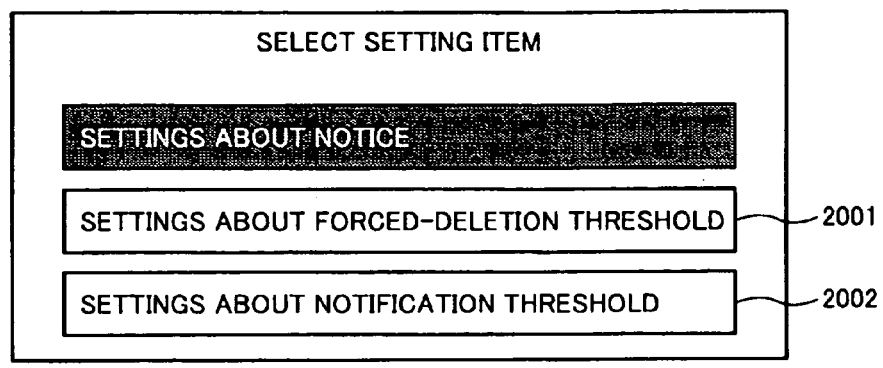
FIG. 20 is a schematic diagram of a screen appearing on the operation display unit for selecting a desired setting item according to the fourth embodiment.

The receiving unit 1323 receives setting about the forced-deletion threshold on the user basis. FIG. 20 is a schematic diagram of a screen appearing on the operation display unit 203 for selecting a desired setting item according to the fourth embodiment. After the user inputs the information for identifying himself via the screen shown in FIG. 15, the user selects a forced-deletion-threshold setting button 2001 or a notification-threshold setting button 2002 as the setting item via the operation display unit 203. If the notification-threshold setting button 2002 is selected, the receiving unit 1323 will receive settings about the notification threshold via the screen shown in FIG. 16.

Figure 21:
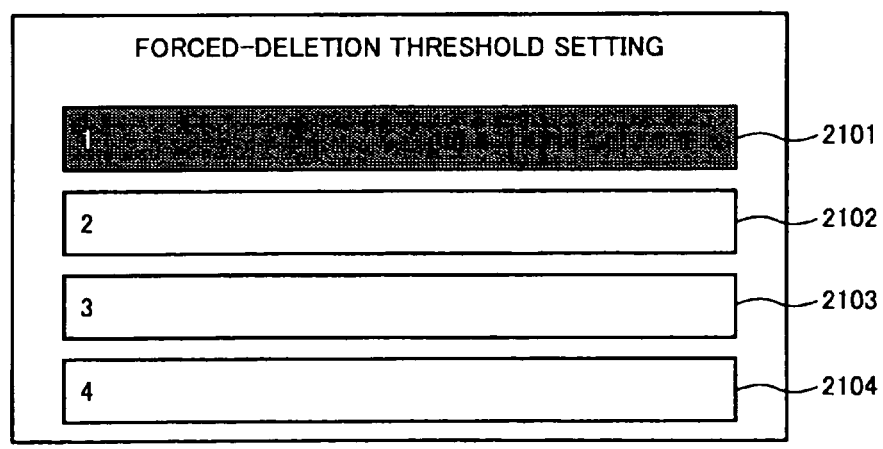
FIG. 21 is a schematic diagram of a screen appearing on the operation display unit for setting a forced-deletion threshold according to the fourth embodiment.

On the other hand, if the forced-deletion-threshold setting button 2001 is selected, the receiving unit 1323 will receive settings about the forced-deletion threshold via a screen shown in FIG. 21 on the user basis. FIG. 21 is a schematic diagram of the screen appearing on the operation display unit 203 for setting the forced-deletion threshold according to the fourth embodiment. The user sets a value of the forced-deletion threshold for the number by selecting one of a button 2101 indicating "1", a button 2102 indicating "2", a button 2103 indicating "3", and a button 2104 indicating "4" via the operation display unit 203. When the user tries to set the total amount as the data amount, the user sets the forced-deletion threshold for the total amount in the similar manner.

After received by the receiving unit 1323, the forced-deletion threshold is stored in the storage unit 202 by the determining unit 1322. In the fourth embodiment, the forced-deletion threshold for the number and forced-deletion threshold for the total amount are stored in associated with the user name.

If the determining unit 1322 determines that the data amount of the previous print data is smaller than the forced-deletion threshold (No at Step S1906), the process control goes to Step S1907.

If the determining unit 1322 determines that the data amount is equal to or larger than the forced-deletion threshold (Yes at Step S1906), the notifying unit 1321 acquires the contact-address information from the new print data (Step S1917). The notifying unit 1321 then discards the new print data (Step S1918). In other words, the MFP 1320 denies the input of the new print data via the PC 1801 by discarding the new print data. After that, the notifying unit 1321 sends a notice saying that the new print data has been discarded (hereinafter, "discard notice") to the PC that is identified by using the acquired contact-address information (Step S1919). The notifying unit 1321 sends, in addition, the list of the previous print data to the PC as the notice (Step S1920).

Figure 22A:
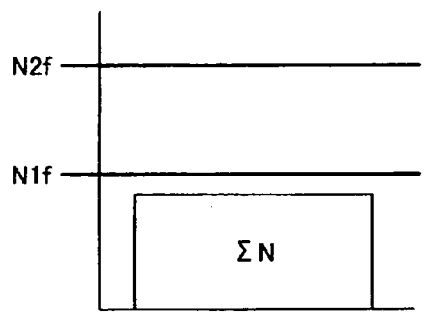
FIGS. 22A to 22F are graphs of relations between forced-deletion threshold, notification threshold, and number of pieces of the previous print data or total amount of the previous print data.
Figure 22B:
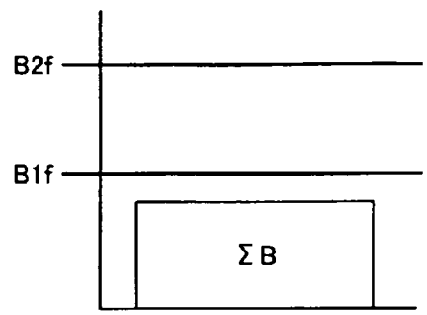

FIGS. 22A to 22F are graphs of relations between the forced-deletion threshold, the notification threshold, and the number of pieces of the previous print data or the total amount of the previous print data. If the number of pieces of the previous print data ($\Sigma N$) is smaller than the notification threshold for the number ($N1f$) as shown in FIG. 22A, the notifying unit 1321 does not send the list of the previous print data. If the total amount of the previous print data ($\Sigma B$) is smaller than the notification threshold for the total amount ($B1f$) as shown in FIG. 22B, the notifying unit 1321 does not send the list of the previous print data.

Figure 22C:
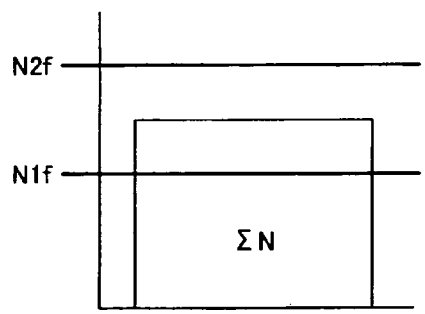
Figure 22D:
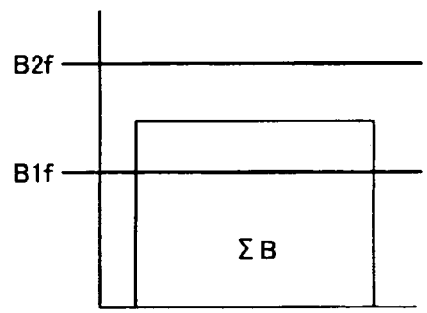

On the other hand, if $\Sigma N$ is equal to or larger than $N1f$ as shown in FIG. 22C, the notifying unit 1321 sends the list of the previous print data. If $\Sigma B$ is equal to or larger than $B1f$ as shown in FIG. 22D, the notifying unit 1321 sends the list of the previous print data.

Figure 22E:
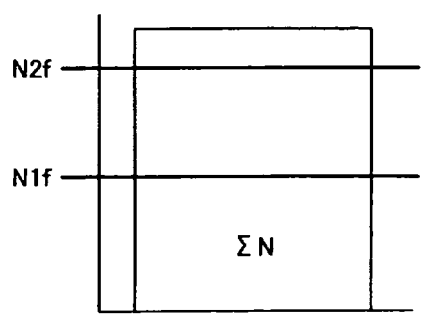

If $\Sigma N$ is equal to or larger than the forced-deletion threshold for the number ($N2f$) as shown in FIG. 22E, the notifying unit 1321 discards the new print data, and the notifying unit

Figure 22F:
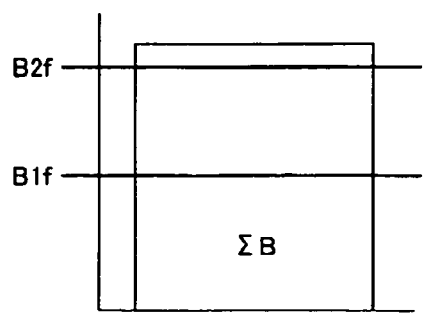

1321 sends the list of the previous print data. If ΣB is equal to or larger than the forced-deletion threshold for the total amount (B2f) as shown in FIG. 22F, the notifying unit 1321 discards the new print data, and sends the list of the previous print data.

A displaying process performed by the PC 1801 according to the fourth embodiment is described below. Most functions and configuration of the PC used in the fourth embodiment are the same as those of the PC used in the first embodiment to the third embodiment. Therefore, only different parts are described below. In the fourth embodiment, the PC displays the notice saying that the new print data has been discarded. The PC displays the list of the previous print data and sends the delete command to the MFP. As a result, the previous print data is processed surely.

Figure 23:
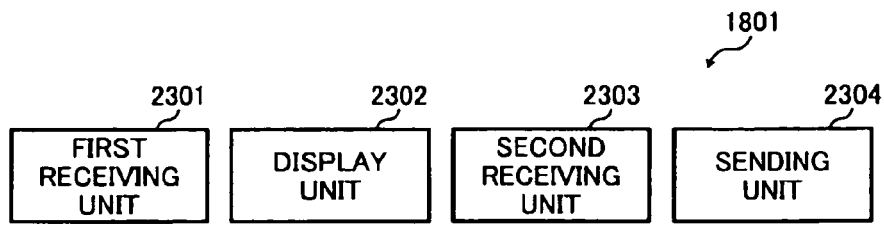
FIG. 23 is a block diagram of the software configuration of a PC shown in FIG. 18.
Figure 24:
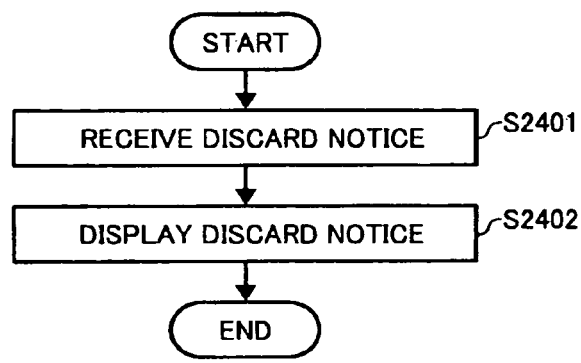
FIG. 24 is a flowchart of a first displaying process performed by the PC in response to receiving of a discard notice saying that new print data has been discarded according to the fourth embodiment.
Figure 25:
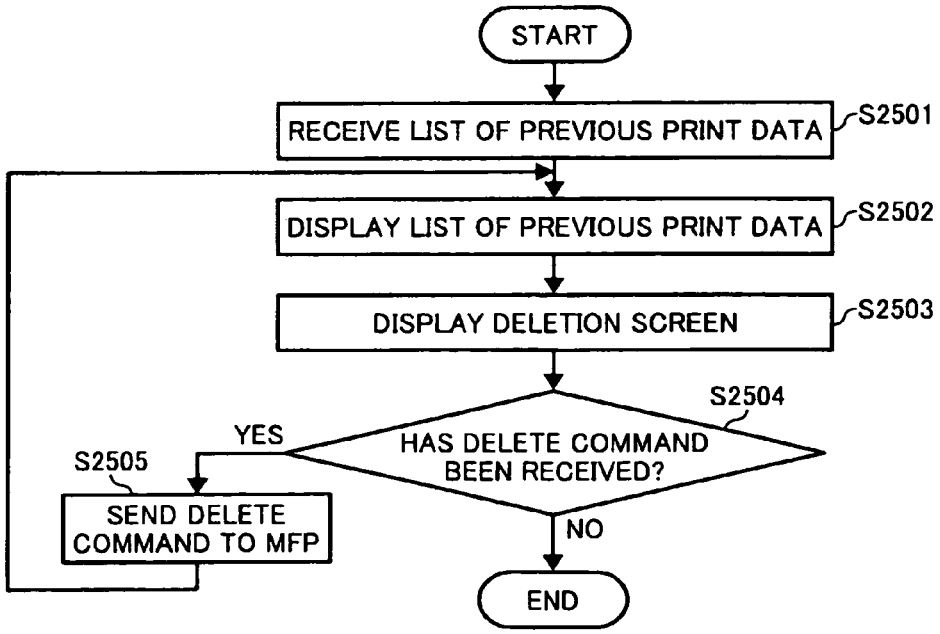
FIG. 25 is a flowchart of a second displaying process performed by the PC in response to receiving of the list of the previous print data according to the fourth embodiment.

FIG. 23 is a block diagram of the software configuration of the PC 1801 according to the fourth embodiment. FIG. 24 is a flowchart of a first displaying process performed by the PC 1801 in response to receiving of the discard notice saying that the new print data has been discarded. FIG. 25 is a flowchart of a second displaying process performed by the PC 1801 in response to receiving of the list of the previous print data.

The first displaying process is described below.

A first receiving unit 2301 receives the discard notice from the MFP 1320 (Step S2401). In the forth embodiment, the first receiving unit 2301 receives the notice saying that the new print data has been discarded via the network I/F 708.

A display unit 2302 displays the received discard notice (Step S2402). In the fourth embodiment, a message saying that the new print data has been discarded appears on the display device 710.

The second displaying process is described below.

Figure 26:
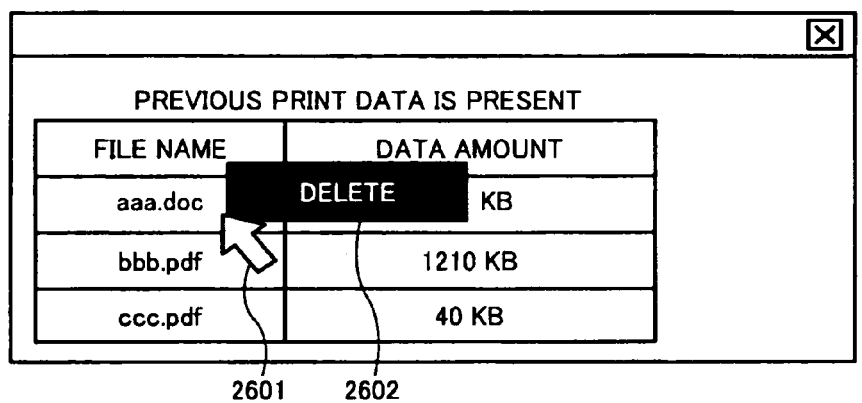
FIG. 26 is a schematic diagram of a deletion screen appearing on the operation display unit with the list of the previous print data according to the fourth embodiment.

The first receiving unit 2301 receives the list of the previous print data from the MFP 1320 (Step S2501). The display unit 2302 displays the received list of the previous print data and a screen for selecting a piece of the previous print data to be deleted (hereinafter, "deletion screen") (Step S2502 and Step S2503). In the fourth embodiment, the user sees the list of the previous print data appearing on the display device 710, and notices that the previous print data is still present in the MFP 1320. FIG. 26 is a schematic diagram of the deletion screen appearing on the operation display unit 203 with the list of the previous print data according to the fourth embodiment. The message saying that the previous print data is still present and the table including file name and amount of the previous print data in the associated manner appear on the deletion screen. Thus, the user sees the deletion screen and notices that the previous print data is still present. If the user moves a pointer 2601 onto a piece of the print data to be deleted and clicks the right button of the mouse (not shown), a deletion menu 2602 appears. The user can issue the delete command to delete the specified piece of the print data by selecting "delete" from the deletion menu 2602.

A second receiving unit 2303 receives the delete command to delete the specified piece of the print data from the user (Step S2504). In the fourth embodiment, the second receiving unit 2303 receives the delete command via the input device 709.

When the second receiving unit 2303 receives the delete command (Yes at Step S2504), a sending unit 2304 sends the received delete command to the MFP 1320 (Step S2505). The process control returns to Step S2502, and the list of the previous print data is displayed again. In the fourth embodiment, the PC 1801 sends the user information or the file name of the specified piece of the print data to be deleted to the MFP 1320, thereby commanding the MFP 1320 to delete the specified print data. The second receiving unit 2303 can be configured to receive an input of the password along with the delete command from the user. Only if the received password matches the password included in the specified piece of the print data to be deleted, the sending unit 2304 sends the delete command to the MFP 1320. If no delete command is received, the process control ends the process.

Figure 27:
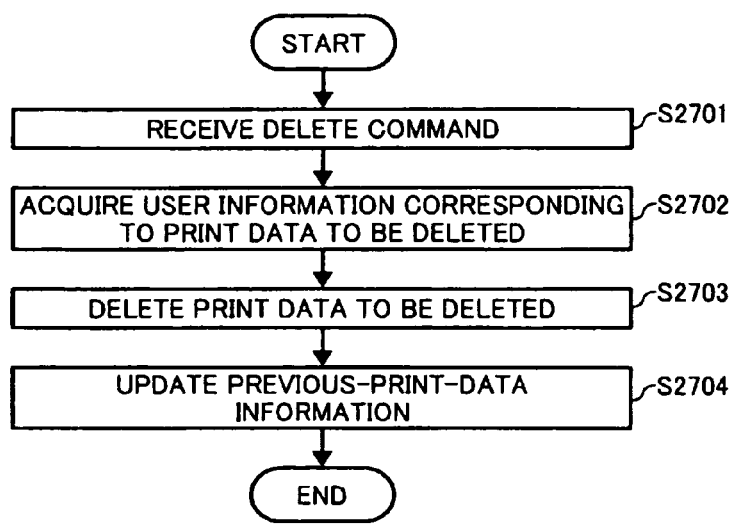
FIG. 27 is a flowchart of a deleting process in which an MFP deletes the print data according to the fourth embodiment.

FIG. 27 is a flowchart of a deleting process in which the MFP 1320 deletes the print data in response to receiving of the delete command.

The receiving unit 1323 receives the delete command from the PC 1801 (Step S2701). In the fourth embodiment, the receiving unit 1323 receives the delete command via the network I/F 205.

The management unit 401 deletes the specified piece of the print data from the storage unit 202. In the fourth embodiment, the management unit 401 acquires the user information corresponding to the specified piece of the print data from the received delete command (Step S2702). The management unit 401 then deletes the print data having the acquired user information from the storage unit 202 (Step S2703). Alternatively, the management unit 401 acquires the file name from the delete command and deletes the print data having the acquired file name from the storage unit 202, instead of the user information. After the print data is deleted, the management unit 401 updates the previous-print-data information assigned with the user who is identified by the acquired user information (Step S2704).

In this manner, if the data amount of the previous print data is equal to or larger than the forced-deletion threshold, the MFP 1320 denies the input of the new print data by discarding the new print data. After that, upon receiving the delete command from the PC 1801, the MFP 1320 deletes therefrom the previous print data. Thus, the MFP 1320 suppresses the amount of the print data stored in the storage unit 202, and surely processes the previous print data.

According to an aspect of the present invention, if an image forming apparatus receives new print data from a user via an external device with previous print data being present in a storage unit, the image forming apparatus sends a notice to the user that the previous print data is still present. Thus, the user who has issued a command to print the new print data via the external device can surely see the notice and process the previous print data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus configured to that receive print data from an external device and print out the print data in response to a print command, the image forming apparatus comprising:
   a storage unit configured to that store therein the print data that includes user information;
   a searching unit configured to that search, when upon receiving new print data is received from the external device, the storage unit for previous print data that includes user information same as that of the new print data;
   a notifying unit configured to that send, when upon the searching unit finds searching and finding the previous print data, a notice to the external device saying that the previous print data is still present in the storage unit;
   a determining unit configured to determine whether a data amount of the previous print data is equal to or larger than a first threshold and determine whether the data amount of the previous print data is equal to or larger than a second threshold that is relatively larger than the first threshold, wherein the notifying unit sends the notice to the external device upon the determining unit determining that the data amount of the previous print data is equal to or larger than the first threshold; and a discarding unit configured to discard the new print data upon the determining unit determining that the data amount of the previous print data is equal to or larger than the second threshold.

2. The image forming apparatus according to claim 1, wherein the notifying unit sends a list of the previous print data as the notice only if the new print data is to be stored in the storage unit.

3. The image forming apparatus according to claim 1, further comprising a receiving unit configured to receive settings about the first threshold.

4. The image forming apparatus according to claim 1, further comprising a receiving unit configured to receive settings about the second threshold.

5. The image forming apparatus according to claim 1, wherein the data amount of the previous print data is number of pieces of the previous print data.

6. The image forming apparatus according to claim 1, wherein the data amount of the previous print data is total amount of the previous print data.

7. The image forming apparatus according to claim 1, further comprising a receiving unit configured to receive settings about the data amount of the previous print data.

8. An image forming system comprising:

an external device; and an image forming apparatus configured to receive print data including user information from the external device and print out the print data in response to a print command from the external device, wherein the image forming apparatus includes:

a storage unit configured to store therein the print data;

a searching unit configured to search, upon receiving new print data from the external device, the storage unit for previous print data that includes user information same as that of the new print data; and a notifying unit configured to send, upon the searching unit searching and finding the previous print data, a notice to the external device saying that the previous print data is still present in the storage unit, a determining unit configured to determine whether a data amount of the previous print data is equal to or larger than a first threshold and determine whether the data amount of the previous print data is equal to or larger than a second threshold that is relatively larger than the first threshold, wherein the notifying unit sends the notice to the external device upon the determining unit determining that the data amount of the previous print data is equal to or larger than the first threshold, and a discarding unit configured to discard the new print data upon the determining unit determining that the data amount of the previous print data is equal to or larger than the second threshold; and the external device includes a first receiving unit configured to receive the notice from the image forming apparatus; and a display unit configured to display thereon the received notice.

9. The image forming system according to claim 8, wherein the external device further includes a second receiving unit configured to receive a delete command to delete a specified piece of the previous print data from the storage unit; and a sending unit configured to send the delete command to the image forming apparatus, and the image forming apparatus further includes a receiving unit configured to receive the delete command from the external device; and a deleting unit configured to delete the specified piece of print data from the storage unit.

10. An image forming method realized in an image forming system that includes an external device and an image forming apparatus that receives print data from the external device and prints out the print data in response to a print command from the external device, the image forming method comprising:

the image forming apparatus performing storing the print data that includes user information received from the external device in a storage unit, searching, upon receiving new print data from the external device, the storage unit for previous print data that includes user information same as that of the new print data, sending, upon searching and finding the previous print data, a notice to the external device saying that the previous print data is still present in the storage unit, determining whether a data amount of the previous print data is equal to or larger than a first threshold and whether the data amount of the previous print data is equal to or larger than a second threshold that is relatively larger than the first threshold, sending, upon determining that the data amount of the previous print data is equal to or larger than the first threshold, the notice to the external device, and discarding the new print data upon determining that the data amount of the previous print data is equal to or larger than the second threshold; and the external device performing receiving the notice from the image forming apparatus, and displaying received notice on a display unit.

11. The image forming method according to claim 10, further comprising:

the external device performing receiving a delete command to delete a specified piece of the previous print data from the storage unit, and sending the delete command to the image forming apparatus; and the image forming apparatus performing receiving the delete command from the external device, and deleting the specified piece of the previous print data from the storage unit.

* * * * *